US008873753B2

(12) United States Patent
Parker (10) Patent No.: US 8,873,753 B2
(45) Date of Patent: Oct. 28, 2014

(54) ANALYSIS OF NETWORK OPERATION (75) Inventor: Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 20 days.

(21) Appl. No.: 13/595,339

(22) Filed: Aug. 27, 2012

(65) Prior Publication Data

US 2014/0059678 A1 Feb. 27, 2014

(51) Int. Cl.
H04L 29/06 (2006.01)
(52) U.S. Cl.
CPC .................................. H04L 63/1408 (2013.01)
USPC ....................................................... 380/250
(58) Field of Classification Search
CPC .. H04L 41/5067; H04L 63/1408; H04L 63/20
USPC ....................................................... 380/250
See application file for complete search history.

(56) References Cited

U.S. PATENT DOCUMENTS

| 2002/0095593 | A1* | 7/2002 | Daniell et al. | 713/200 |
|---|---|---|---|---|
| 2002/0198473 | A1* | 12/2002 | Kumar et al. | 600/595 |
| 2003/0033403 | A1* | 2/2003 | Rhodes | 709/224 |
| 2003/0200282 | A1* | 10/2003 | Arnold et al. | 709/219 |
| 2004/0133733 | A1* | 7/2004 | Bean et al. | 711/100 |
| 2005/0256884 | A1* | 11/2005 | Arnold et al. | 707/10 |
| 2006/0031472 | A1* | 2/2006 | Rajavelu et al. | 709/224 |
| 2006/0106583 | A1* | 5/2006 | Fdida et al. | 702/189 |
| 2006/0262730 | A1* | 11/2006 | Fournigault et al. | 370/251 |
| 2006/0294080 | A1* | 12/2006 | Arnold et al. | 707/3 |
| 2007/0255847 | A1* | 11/2007 | Smith | 709/231 |
| 2008/0043627 | A1* | 2/2008 | Singh et al. | 370/241 |
| 2008/0219178 | A1* | 9/2008 | Barrett | 370/252 |

OTHER PUBLICATIONS

Ricciato; Traffic monitoring and analysis for the optimization of a 3G network; Wireless Communications, IEEE (vol. 13 , Issue: 6 ); Date of Publication: Dec. 2006; pp. 42-49; IEEE Xplore.*

Kazemi et al.; MMAN—a monitor for mobile ad hoc networks: design, implementation, and experimental evaluation; Proceeding WiNTECH '08 Proceedings of the third ACM international workshop on Wireless network testbeds, experimental evaluation and characterization; 2008; pp. 57-64; ACM Digital Library.*

* cited by examiner

Primary Examiner — Bradley Holder (57) ABSTRACT

A network device is configured to receive information from a number of different types of data collection devices. The information may relate to operation of devices in a network and communications in the network. The network device is configured to further analyze the information and determine that an issue exists relating to operation of the network. The network device is configured further to send a message to a policy device based on determining that the issue exists relating to the operation of the network. The policy device may generate or change a rule or policy associated with the operation of the network, based on the message, to instruct one or more other network devices to change the operation of the network.

20 Claims, 7 Drawing Sheets

ANALYSIS OF NETWORK OPERATION

BACKGROUND

A network may provide service to a user device connected to the network. During the operation of the network, quality of service (QoS) issues may occur that are associated with providing service to a user device. During the operation of the network, there may also be security threats to the network.

DETAILED DESCRIPTION OF PREFERRED EMBODIMENTS

The following detailed description refers to the accompanying drawings. The same reference numbers in different drawings may identify the same or similar elements.

Systems and/or methods described herein may analyze information about the operation of a network, determine whether there are any issues relating to the operation of the network, and implement corrective measures to resolve the issues associated with the operation of the network. For example, a network analysis device may determine that there is a higher than normal rate of inbound data packets being sent to a network device in a network. The network analysis device may analyze the rate and determine that the data packets are associated with a potential security threat to the network. The network analysis device may communicate its determination to another network device associated with taking corrective measures to resolve the security threat, such as routing data packets away from the network. The analysis system may also determine that there are potential QoS issues that exist, such as insufficient bandwidth to provide a desired level of QoS for a particular number of user devices in a coverage area of the network. The network analysis device may communicate its determination to another network device associated with taking measures to reduce QoS issues, such as reducing the number of connections in the coverage area of the network.

Figure 1A:
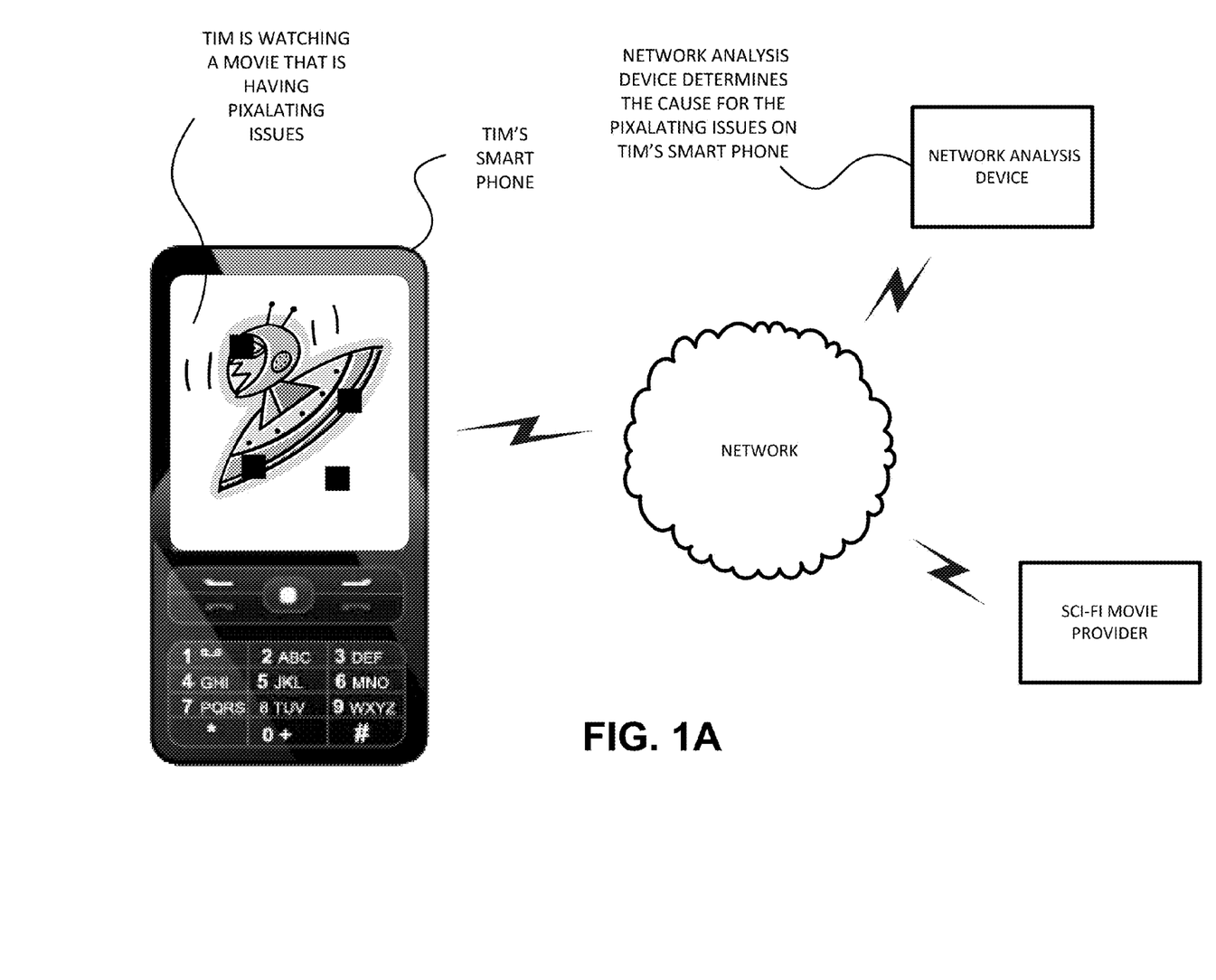
FIGS. 1A-1B are diagrams of an overview of an implementation described herein.
Figure 1B:
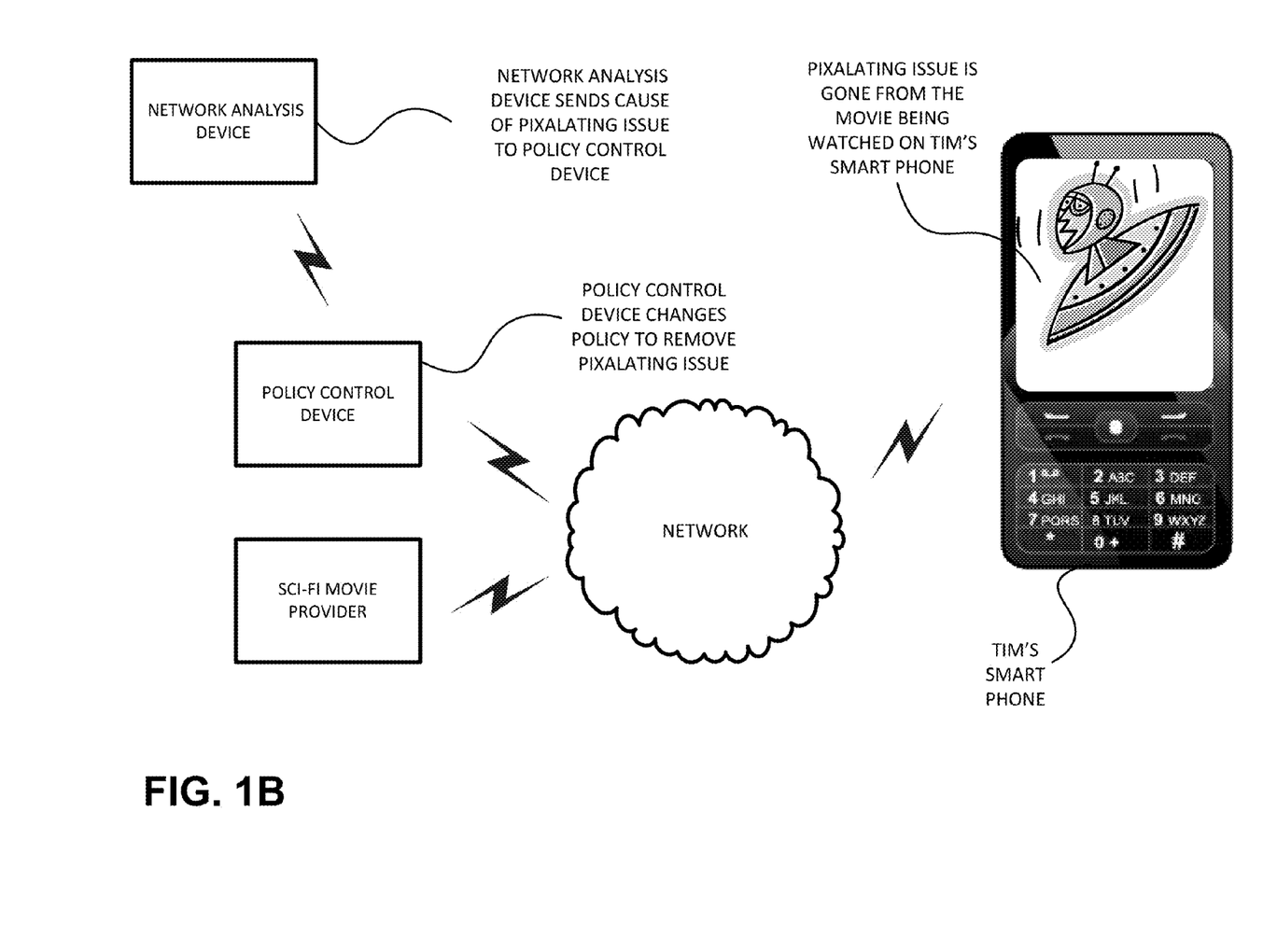

FIGS. 1A-1B are diagrams of an overview of an implementation described herein. As shown in FIG. 1A, a user ("Tim") is using his smart phone (Tim's smart phone) to watch a movie that he is receiving from Sci-Fi movie provider via a network. As Tim is watching the movie, pixels begin to randomly appear in the movie. As Tim is watching the movie, the network analysis device may be receiving information about the operation of the network. The network analysis device may receive communication information between different user devices associated with a coverage area of the network. Tim's smart phone is located in that particular coverage area of the network. The network analysis device may analyze the communication between Tim's smart phone and the Sci-Fi movie provider to determine whether there are any QoS issues and/or any security threat issues relating to the network. The network analysis device may determine that in this particular coverage area of the network, there are an excessive number of messages (e.g., including content) being sent to/from different user devices. The network analysis device may determine that there are above than average number of user devices being used to receive video content (including Tim's smart phone) in that particular coverage area of the network. The network analysis device may determine that the excessive number of messages may be cause of the QoS issue (pixels appearing in the movie) associated with the movie being watched on Tim's smart phone.

As shown in FIG. 1B, the network analysis device may determine that to resolve the data traffic congestion issue in the particular coverage area of the network, the number of user devices connected to the network, in that particular coverage area, should be reduced. The network analysis device may send the outcome of the analysis to a policy control device. The policy control device may change a policy to reduce the number of user devices connected in that particular coverage area. The policy control device may communicate the new policy to the network. The network may implement the new policy, and Tim is able watch the movie on his smart phone without any pixelating issues.

As a result, a network may operate more efficiently based on an analysis system that is able to detect threats to network security, detect issues relating to QoS, and/or detect other issues within the network, and provide solutions to those potential network issues. With the ability to efficiently resolve the QoS, security, and other network issues, the network may provide a greater level of network security and/or a better level of QoS to the users of the network.

Figure 2:
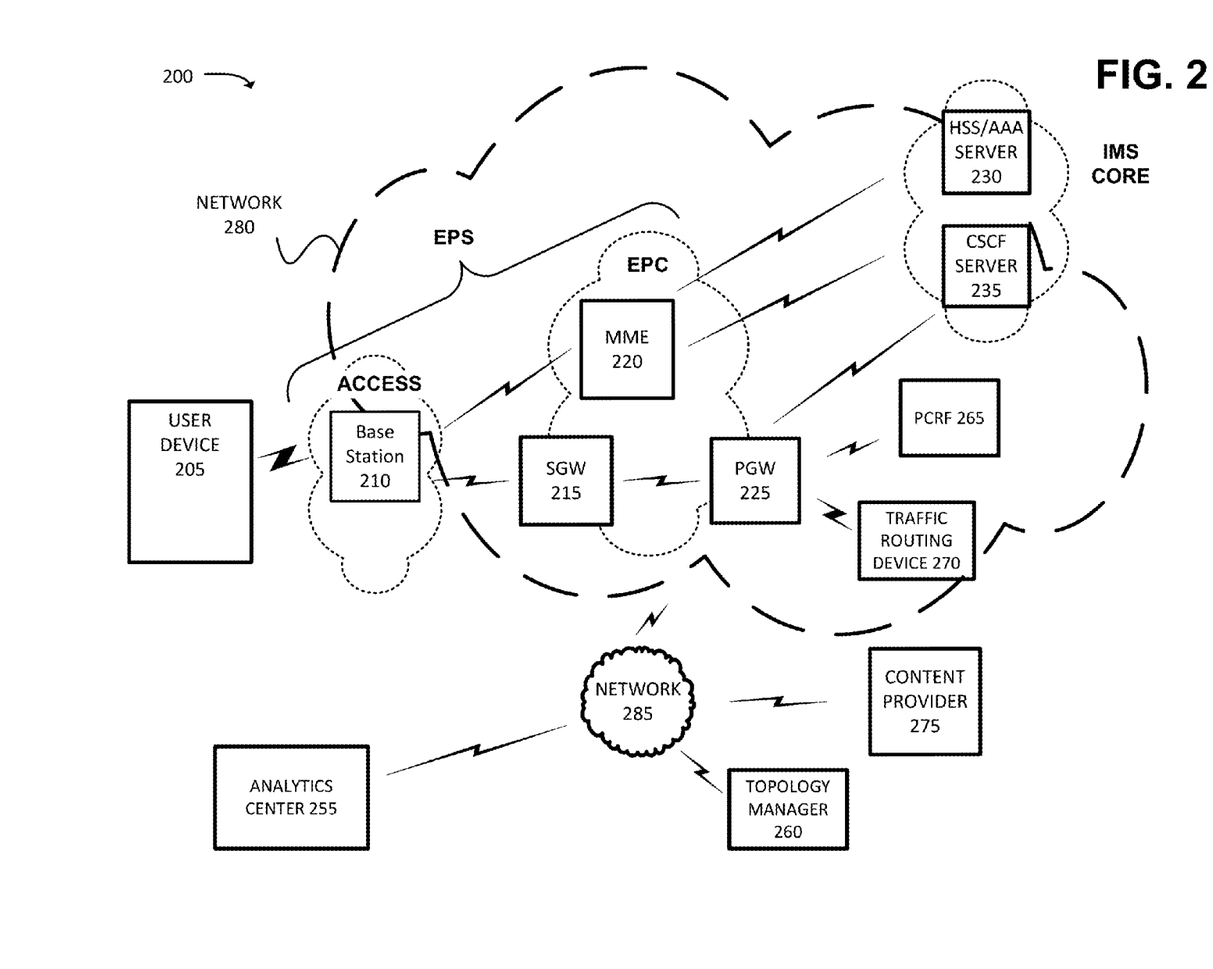
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 205, a base station 210, a serving gateway 215 (hereinafter referred to as "SGW 215"), a mobility management entity device 220 (hereinafter referred to as "MME 220"), a packet data network (PDN) gateway 225 (hereinafter referred to as "PGW 225"), a home subscriber server (HSS)/authentication, authorization, accounting (AAA) server 230 (hereinafter referred to as "HSS/AAA server 230"), a call session control function (CSCF) server 235 (hereinafter referred to as "CSCF server 235"), analytics center 255, topology manager 260, policy charging and rules function (hereinafter referred to as "PCRF 265"), traffic routing device 270, content provider 275, network 280, and network 285.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

User device 205 may include any computation or communication device, such as a wireless mobile communication device that is capable of communicating with a network (e.g., network 280). For example, user device 205 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, or another mobile, computation, or communication device.

User device 205 may include a variety of applications, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Base station 210 may include one or more network devices that receive, process, and/or transmit traffic, such as audio, video, text, and/or other data, destined for and/or received from user device 210. In an example implementation, base station 210 may be an eNB device and may be part of the LTE network. Base station 210 may receive traffic from and/or send traffic to other networks via SGW 215 and PGW 225. Base station 210 may send traffic to and/or receive traffic from user device 205 via an air interface. One or more of base stations 210 may be associated with a RAN, such as the LTE network.

SGW 215 may include one or more network devices, or other types of computation or communication devices, that gather, process, search, store, and/or provide information in a manner described herein. SGW 215 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 215 may, for example, aggregate traffic received from one or more base stations 210 and may send the aggregated traffic to other networks via PGW 225. In one example implementation, SGW 215 may route and forward user data packets, may act as a mobility anchor for a user plane during inter-base station handovers, and may act as an anchor for mobility between LTE and other 3GPP technologies.

MME 220 may include one or more network devices that gather, process, search, store, and/or provide information in a manner described herein. For example, MME 220 may perform operations associated with a handoff to and/or from the EPS. MME 220 may perform operations to register user device 205 with the EPS, to hand off user device 205 from the EPS to another network, to hand off a user device 205 from the other network to the EPS, and/or to perform other operations. MME 220 may perform policing operations for traffic destined for and/or received from user device 205.

PGW 225 may include one or more network devices that gather, process, search, store, and/or provide information in a manner described herein. PGW 225 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 225 may, for example, provide connectivity of user device 205 to external packet data networks by being a traffic exit/entry point for user device 205. PGW 225 may perform policy enforcement, packet filtering, charging support, lawful intercept, and packet screening. PGW 225 may also act as an anchor for mobility between 3GPP and non-3GPP technologies. PGW 225 may authenticate user device 205 (e.g., via interaction with HSS/AAA server 230).

HSS/AAA server 230 may include one or more network devices, or other types of computation or communication devices, that gather, process, search, store, and/or provide information in a manner described herein. For example, HSS/AAA server 230 may manage, authenticate, update, and/or store, in a memory associated with HSS/AAA server 230, profile information associated with user device 205 that identifies applications and/or services that are permitted for and/or accessible by user device 205, bandwidth or data rate thresholds associated with the applications or services, information associated with a user of user device 205 (e.g., a username, a password, a personal identification number (PIN), etc.), rate information, minutes allowed, and/or other information. Additionally, or alternatively, HSS/AAA server 230 may include a device that performs authentication, authorization, and/or accounting (AAA) operations associated with a communication session with user device 205.

CSCF server 235 may include one or more network devices, or other types of computation or communication devices, that gather, process, search, store, and/or provide information in a manner described herein. CSCF server 235 may process and/or route calls to and from user device 210 via the EPC. For example, CSCF server 235 may process calls (received from other networks) that are destined for user device 205. In another example, CSCF server 235 may process calls, received from user device 205, that are destined for other networks.

Analytics center 255 may include one or more network devices, or other types of computation or communication devices, that gather, process, search, and/or provide information in a manner described herein. Analytics center 255 may perform different types of analysis (e.g., flow analysis) on inbound and outbound communications for different network devices (e.g., PGW 225, MME 220, etc.) within network 280. Analytics center 255 may analyze signaling and bearer interfaces (e.g., Gi interface, Rx interface, etc.) within network 280. Analytics center 255 may analyze the operation of the network regarding issues relating to QoS (e.g., latency, bit error rate levels, traffic congestion). Analytics center 255 may analyze the operation of the network regarding issues relating to potential security issues (e.g., incoming network traffic that may disable a network device that may result in a loss of service to user device 205).

Topology manager 260 may include one or more network devices, or other types of computation or communication devices, that gather, process, search, and/or provide information in a manner described herein. Topology manager 260 may receive information from analytics center 255. Topology manager 260 may provide the information (received from analytics center 255) in a format that can be viewed by a user associated with the provider of network 280. Topology manager 260 may receive commands from a user to make changes to the operation of network 280. Topology manager 260 may receive the input from the user and may communicate the changes (to the operation of network 280) to PCRF 265, traffic routing device 270, and/or other network devices that may implement changes to the network operation. Topology manager 260 may be part of analytics center 255 or topology manager 260 may be a separate device from analytics center 255.

PCRF 265 may include one or more network devices, or other types of computation or communication devices, that gather, process, search, and/or provide information in a manner described herein. PCRF 265 may also store subscriber information, such as voice call and data rate plans or quotas for subscribers (e.g., users of network 280). PCRF 265 may provide network control regarding service data flow detection, gating, QoS, and/or flow based charging. Policies and rules regarding QoS may include policies and rules instructing user device 210 and network elements (base station 210, SGW 215, MME 220, PGW 225, etc.) to minimize packet loss, to implement a packet delay budget, to provide a guaranteed bit rate (GBR), to provide low latency, and/or to perform other activities associated with QoS. PCRF 265 may provide policies and rules to other network devices, such as HSS/AAA server 230 and/or PGW 225, to implement network control. PCRF 265 may determine how a certain service data flow shall be treated, and may ensure that user plane traffic mapping and QoS is in accordance with a user's profile and/or network policies. PCRF 265 may have an analytics interface that allows PCRF 265 to communicate with analytics center 255. PCRF may have a management interface that allows PCRF 265 to communicate with topology manager 270.

Traffic routing device 270 may include one or more network devices that gather, process, search, store, and/or provide information in a manner described herein. Traffic routing device 270 may include one or more data processing and/or traffic transfer devices, such as a gateway, a router, a modem, a switch, a firewall, a NIC, a hub, a bridge, a proxy server, an OADM, or some other type of device that processes and/or transfers traffic. Traffic routing device 270 may direct data packets from one network device to another network device. Traffic routing device 270 may drop data packets that are being sent to a particular network device. Traffic routing device 270 may create a copy ("mirror the packets") of data packets and send the copy of the data packets to another network device.

Content provider 275 may include one or more network devices, or other types of computation or communication devices that gather, process, and/or provide information in a manner described herein. For example content provider 275 may send, via PGW 225, content to user device 205. The content is intended to be broadly interpreted to include any computer readable data that may be transferred over a network. Content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream).

Network 280 may include an evolved packet system (EPS) that includes an access network, an IMS core and/or an evolved packet core (EPC) that operate based on a third generation partnership project (3GPP) wireless communication standard. The combination of the access network, IMS core, and the EPC may be defined as an LTE network. The access network may be a radio access network (RAN) that includes one or more base stations, such as eNodeBs (eNBs), via which user device 205 communicates with the EPC. The EPC may include SGW 215, MME 220, and/or PGW 225 that enables user device 205 to communicate with network 285 and/or an Internet protocol (IP) multimedia subsystem (IMS) core. The IMS core may include HSS/AAA server 230 and/or CSCF server 235 and may manage authentication, session initiation, account information, a user profile, etc. associated with user device 205. The access network may include multiple base stations 210, and the EPC may include multiple SGWs 215, MMEs 220, and/or PGWs 225. The IMS core may include multiple HSS/AAA servers 230 and/or CSCF servers 235.

While network 280 has been described as an LTE network, network 280 may be another type of network. For example, network 280 may be a mobile cellular network including mobile cellular network devices such as switches, a home location register (HLR), short message service center (SMSC) devices, media message service center (MMSC) devices, voice mail servers, and/or any other network device used in sending text messages, voice mails, phone calls, and/or other types of communications. Network 280 may be include a public land mobile network (PLMN), a second generation (2G) network, a third generation (3G) network, a fourth generation (4G) network, a fifth generation (5G) network, and/or another network. Additionally, or alternatively, network 285 may include a local area network (LAN), a wide area network (WAN), a metropolitan network (MAN), a telephone network (e.g., the Public Switched Telephone Network (PTSN)), an ad hoc network, a managed IP network, a virtual private network (VPN), an intranet, the Internet, a fiber optic-based network, and/or combination of these or other types of networks.

Network 285 may include one or more wired and/or wireless networks. For example, network 285 may include a cellular network, a PLMN, a 2G network, a 3G network, a 4G network, a 5G network, and/or another network. Additionally, or alternatively, network 285 may include a LAN, a WAN, a (MAN, a telephone network (e.g., the PTSN, an ad hoc network, a managed IP network, a VPN, an intranet, the Internet, a fiber optic-based network, and/or combination of these or other types of networks.

Additionally, or alternatively, network 285 may include a radio access network (RAN), such as an LTE network, that may include a variety of components to facilitate mobile communications, such as antennas, base stations, mobile switching centers, and interfaces with PSTNs and/or packet data servicing nodes (PDSNs).

Network 280 and network 285 may be the separate networks, or network 280 and network 285 may be part of the same network.

In some implementations, communications between user device 205 and other devices (associated with network 280) may be via data packets. The data packets may be defined as Internet Protocol (IP) data packets (associated with IP version 4 (IPv4), IP version 6 (IPv6), or any other IP version), session initiation protocol (SIP) data packets, and/or any other type of data packet.

Figure 3:
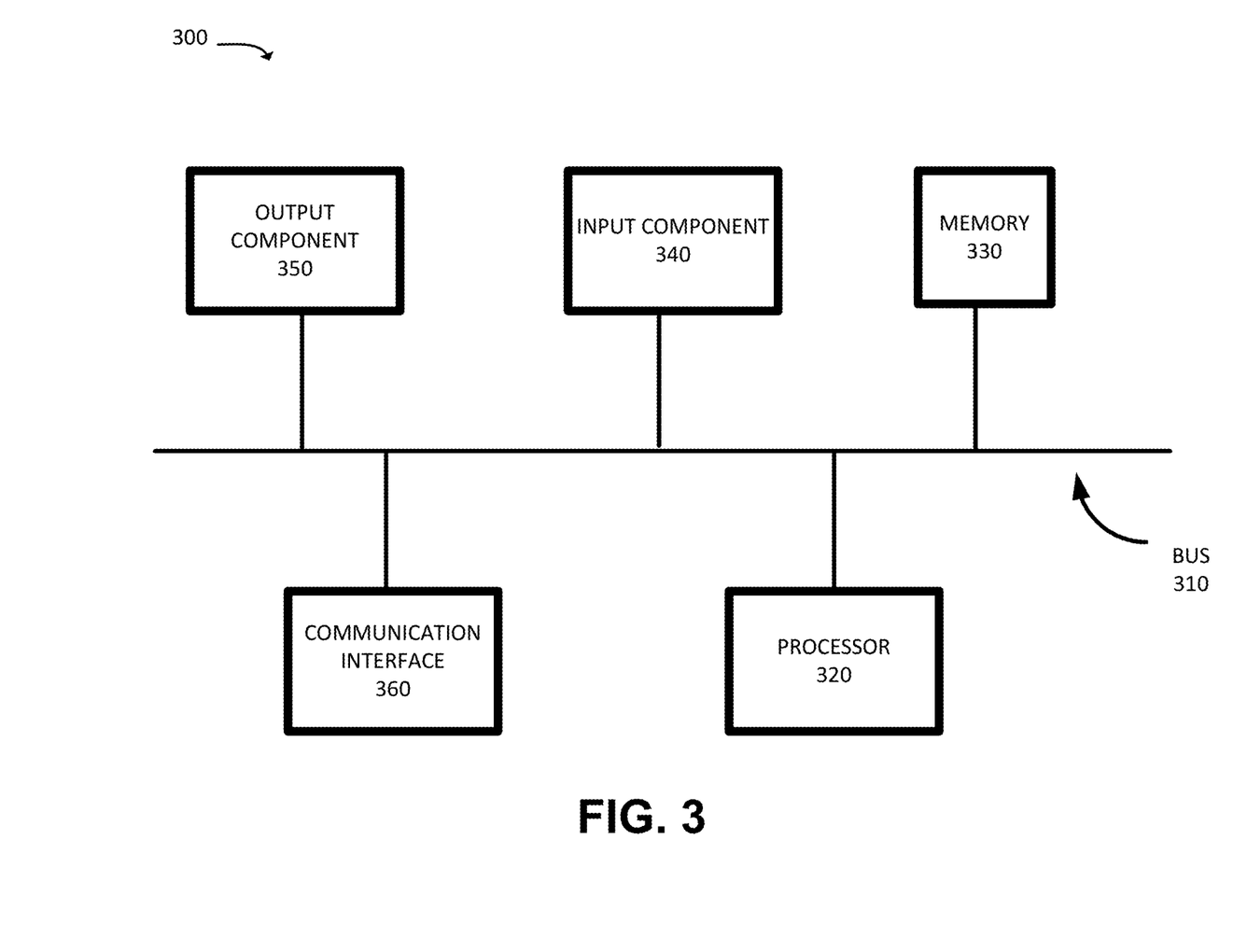
FIG. 3 is a diagram of example components of one or more devices of FIGS. 1A-1B and 2.

FIG. 3 is a diagram of example components of a device 300. Device 300 may correspond to user device 205, base station 210, SGW 215, MME 220, PGW 225, HSS/AAA server 230, CSCF server 235, analytics center 255, topology manager 260, PCRF 265, and/or traffic routing device 270. Additionally, or alternatively, each of user device 205, base station 210, SGW 215, MME 220, PGW 225, HSS/AAA server 230, CSCF server 235, analytics center 255, topology manager 260, PCRF 265, and/or traffic routing device 270 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with other networks and/or devices connected to network 285.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
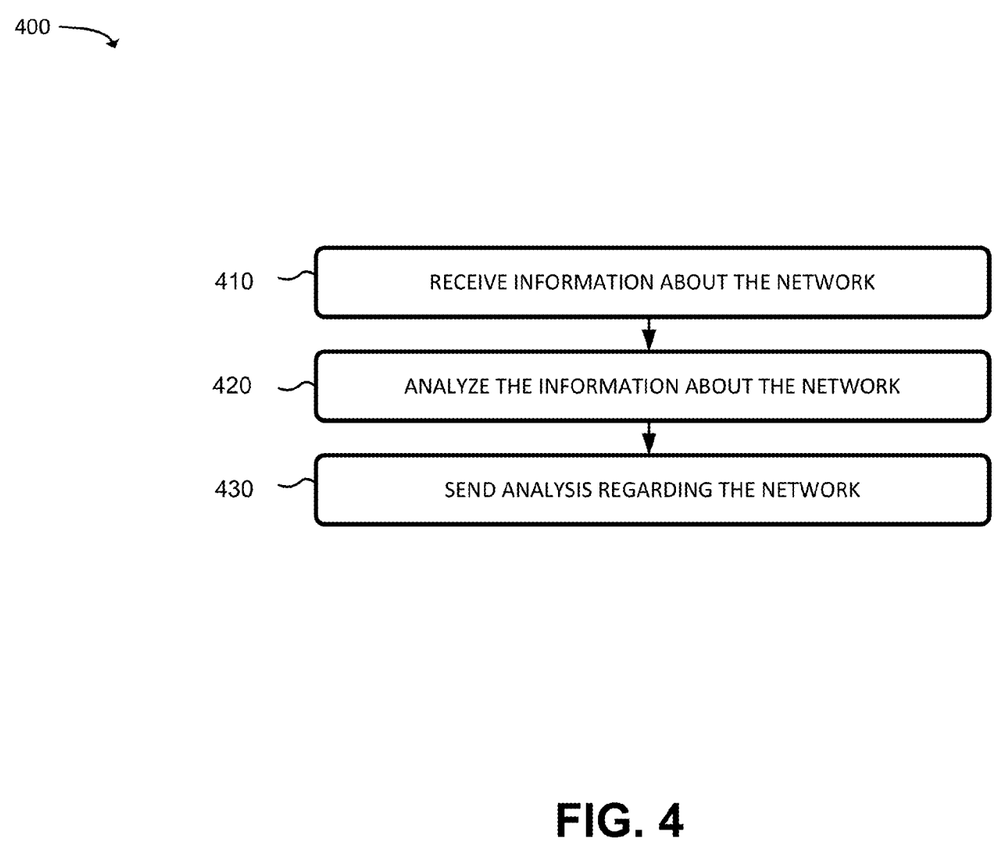
FIG. 4 is a flow chart of an example process for analyzing a network.

FIG. 4 is a flow chart of an example process 400 for analyzing a network. In one implementation, process 400 may be performed by analytics center 255. In another example implementation, one or more blocks of process 400 may be performed by one or more other devices, such as topology manager 260 and/or PCRF 265.

Process 400 may include receiving information about the network (block 410). Analytics center 255 may include or interact with different types of data collection applications to receive information about different network devices and/or interfaces. These different types of data collection applications may send requests for information to different network devices (e.g., SGW 215, PGW 225, MME 220, HSS/AAA server 230, and/or CSCF server 235) and/or different interfaces (Gi interface, Rx interface, etc.) between different network devices for information about network operations.

The data collection applications may include one or more of the following: simple network management protocol (hereinafter referred to as "SNMP"), Syslog, central processing unit utilization (hereinafter referred to as "CPU utilization"), Netflow, session initiation protocol flow information exchange (hereinafter referred to as "SIPFix"), internet protocol flow information exchange (hereinafter referred to as "IPFix"), subscriber packet data, signaling links, and/or any other type of data collection application.

SNMP may be a protocol used to monitor the activities of network devices (e.g., PGW 225, MME 220, etc.). Each network device may have a SNMP interface that may permit analytics center 255 to obtain information regarding the activity of the network device. Syslog may store information associated with computer data logging that may provide information to analytics center 255 regarding the activity of the network. CPU utilization may include information about the amount of time that a network device is active (e.g., how active is MME 220). SIPFix may analyze traffic associated with SIP communications for any QoS or network security issues. SIPFix may provide analytics center 255 with information associated with flow rates of data packets and/or the amount of information, associated with SIP data packets, being sent to/from network devices. IPFix and/or Netflow may analyze traffic associated with IP communications for any QoS or network security issues. IPFix and/or Netflow may provide analytics center 255 with information associated with flow rates of data packets and/or the amount of information, associated with IP data packets, being sent to/from network devices. For example, IPFix may provide information associated with flow rates of data packets being sent between SGW 215 and PGW 225. Subscriber packet data may include information about data packets associated with applications and/or services that are being used by a user of user device 205. Signaling links may provide analytics center 255 with information associated with the set-up, management, and/or tear down of communications between user device 205 and network 280.

The different data collection applications may provide analytics center 255 with information regarding where data packets are being sent into network 280 and where data packets are being sent from network 280 to other networks. Analytics center 255 may receive information regarding data packets that are being sent from network 280 to other networks and/or devices. Analytics center 255 may receive information regarding bandwidth usage associated with incoming or outgoing communications to/from network 280. Analytics center 255 may receive information regarding a quantity of user devices 205 that are associated with a cell site, a region of the network, and/or a distribution site or data center.

Process 400 may include analyzing the information about the network (block 420). Analytics center 255 may analyze information (described with regard to block 410) received from network devices associated with network 280 to determine whether there are any security threats to network 280. Analytics center 255 may analyze data packets to determine whether there are any unsolicited data packets being sent to network devices (e.g., SGW 215, MME 220, etc.). Analytics center 255 may analyze the source of the unsolicited data packets. For example, analytics center 255 may analyze whether the data packets are related to a device (external to network 280) that may be associated with an IP address that is a known source of security threats. Analytics center 255 may determine the rate of the unsolicited data packets being sent to a particular network device or being sent throughout the network. For example, analytics center 255 may analyze the rate of data packets being sent across network 280 to multiple network devices (e.g., SGW 215, PGW 225, etc.) within network 280.

Analytics center 255 may analyze data packets to determine whether the data packets are entering or exiting network 280 at a higher (or lower) than a normal rate associated with the data packets. Analytics center 255 may determine that the higher than normal rate of data packet flow is associated with unknown servers, and/or network devices associated with different IP addresses. Analytics center 255 may analyze data packets from multiple network devices at the same time to determine whether there are any patterns or similarities in the data packet flow rates or the destination of the data packet flows. Analytics center 255 may determine whether data packet flows are occurring in a manner that is not inconsistent with how data packet flows should be occurring. For example, analytics center 255 may determine that there are triple the amount of data packets entering the network at a particular time (e.g., 3:00 a.m.) than a normal rate of data packets that would enter the network at that particular time. Analytics center 255 may use statistical information based on past network operational characteristics to make a determination whether a network characteristic (e.g., data packet flows, bandwidth rates, signaling rates, etc.) are within an acceptable range.

Analytics center 255 may determine whether the data packets are associated with an actual security threat or whether the data packets are associated with an anomaly. Analytics center 255 may determine whether there is an actual security threat to the network or an anomaly based on assessing other data flows in the network and determining whether there is a pattern (which may indicate a security threat) or whether the issue relating to the data packets is a random event (which may indicate an anomaly).

Upon analyzing the data packets for any security threats, analytics center 255 may determine that changes to the operation of the network devices and/or network 280 may be required. The changes may be determined based on the analysis of the source of data packets, the flow rate of the data packets, and/or any patterns associated with the data packets. Analytics center 255 may determine that data packets being sent to a particular network device (e.g., SGW 215, PGW 225, etc.) should be dropped, sent to another network device for further analysis, or a copy of the data packets should be made and sent to another network device for further analysis. Analytics center 255 may determine that the address or identifier for a network device be changed so that the potential security threat is not able to attack the particular network device.

Additionally, or alternatively, analytics center 255 may analyze information (described with regard to block 410) received from network devices associated with network 280 to determine whether there are any QoS issues relating to network 280. Analytics center 255 may determine whether there are issues relating to bit rates, bandwidth, packet delay budgets, latency rates, and/or other factors associated with QoS. Analytics center 255 may determine whether there is sufficient bandwidth to provide service to a specified quantity of user devices 205 within a region of the network (e.g., a cell area, coverage area, area associated with a distribution center, etc.). Analytics center 255 may determine whether there are too many connections (too many user devices 205) within a region of the network. Based on the analysis, analytics center 255 may determine that the quantity of connections should be reduced, based on the priority level of the communication (e.g., a 911 call has greater priority than a regular phone call). Analytics center 255 may determine that the amount of bandwidth should be increased in a particular coverage area of the network or that the bandwidth should be decreased. Analytics center 255 may determine that a user, using user device 205, is using more network resources than are allowed by an agreement between the user and the network service provider of network 280. Analytics center 255 may determine that the amount of information, being used by user device 205, be reduced. Analytics center 255 may determine that there is an excessive quantity of user devices 205 using a network device (e.g., MME 220, SGW 215, PGW 225) and that some of the user devices 205 should be dropped (e.g., based on the type of communication, such as guaranteed bit rate—GBR—video content, and/or the priority of the communication) to provide a minimum level of QoS for the remaining user devices 205.

Process 400 may include sending analysis regarding the network (block 430). In one example implementation, analytics center 255 may send the results of the analysis to topology manager 260. Topology manager 260 may receive the results of the analysis. Topology manager 260 may generate the results in a format that can be viewed by a user associated with the provider of services for network 280. The user may be able to view the results on a user interface (e.g., graphical user interface, web page, etc.) on topology manager 260 or a user device (such as user device 205) connected to topology manager 260. Topology manager 260 may present the user with options on what changes may be made to various network operational characteristics (e.g., changes to network flow destinations, network flow rates, bandwidth levels, changes to the quantity of user devices 205 connected in a particular coverage area of network 280, etc.). For example, the user may be provided analysis that the network flow rate from PGW 225 is 5% higher than the average flow rate associated with PGW 225. The user may decide to change the flow rate from PGW 225.

The user may enter a command to topology manager 260. The command may include information that indicates what steps should be taken to resolve any network security issues or QoS issues. The command may be entered via a user device (e.g., user device 205) that may send the information to topology manager 260. Alternatively, the command may be entered by the user into topology manager 260. Topology manager 260 may receive the input from the user and may send a notification to PCRF 265 to make changes to policies and/or rules (e.g., such as rules associated with QoS) associated with network 280. PCRF 265 may send a message to PGW 225 and/or other network devices (HSS/AAA server 230) to make the changes to the operation of network 280.

Additionally, or alternatively, topology manager 260 may send a notification to traffic routing device 270 to make changes to how data packet traffic is sent between different network devices within network 280 and outside of network 280. For example, traffic routing device 270 may route data packets to another network device for further analysis; traffic routing device 270 may create a copy of the data packets and send the copy to another network device for further analysis; or traffic routing device 270 may prevent the packets from being sent to/from the network devices by dropping the data packets.

Additionally, or alternatively, topology manager 260 may send a notification to other network devices that may implement changes to the operation of network 280.

In another example implementation, analytics center 255 may send the results of the analysis to PCRF 265. PCRF 265 may receive the analysis results and may make changes to policies and/or rules associated with the operation of network 280, based on the analysis results. For example, PCRF 265 may make a policy change regarding the amount of bandwidth associated with data packets being sent to network 280 from a particular content provider.

In another example implementation, analytics center 255 may send the analysis to traffic routing device 270. Traffic routing device 270 may receive the analysis and may make changes, as described above, to how data packets, associated with network traffic, are sent to various network devices and may change the rate at which data packets are sent to various network devices.

In either of the above example implementations, analytics center 255 may change its interface according to the device that is communicating with analytics center 255. For example, if analytics center 255 is communicating with PCRF 265, analytics center 255 may use a command line ("CLI") interface, and if analytics center 255 is communicating with topology manager 260, analytics center 255 may use a Gx interface.

Figure 5A:
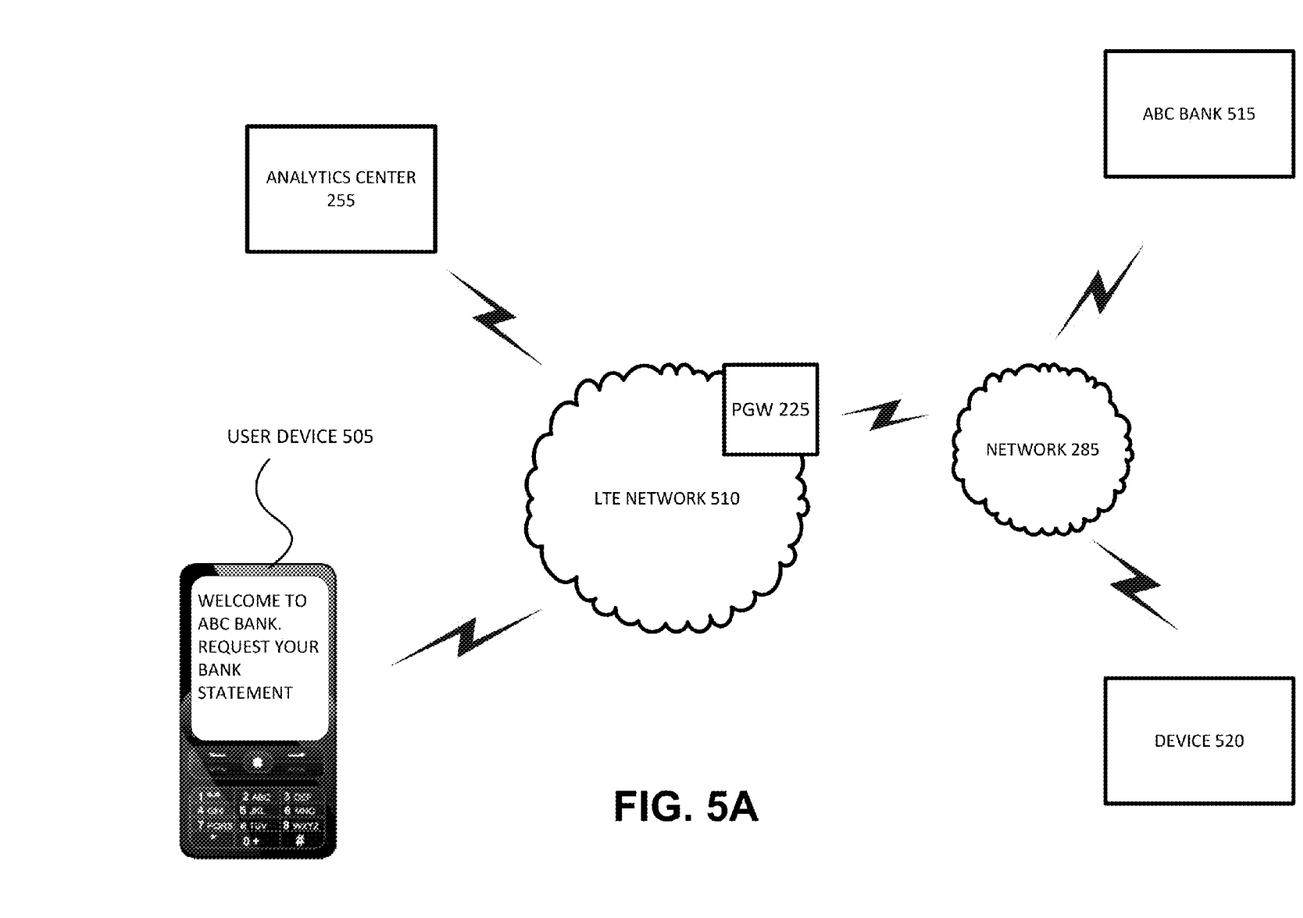
FIGS. 5A-5B are diagrams of example processes for analyzing a network.
Figure 5B:
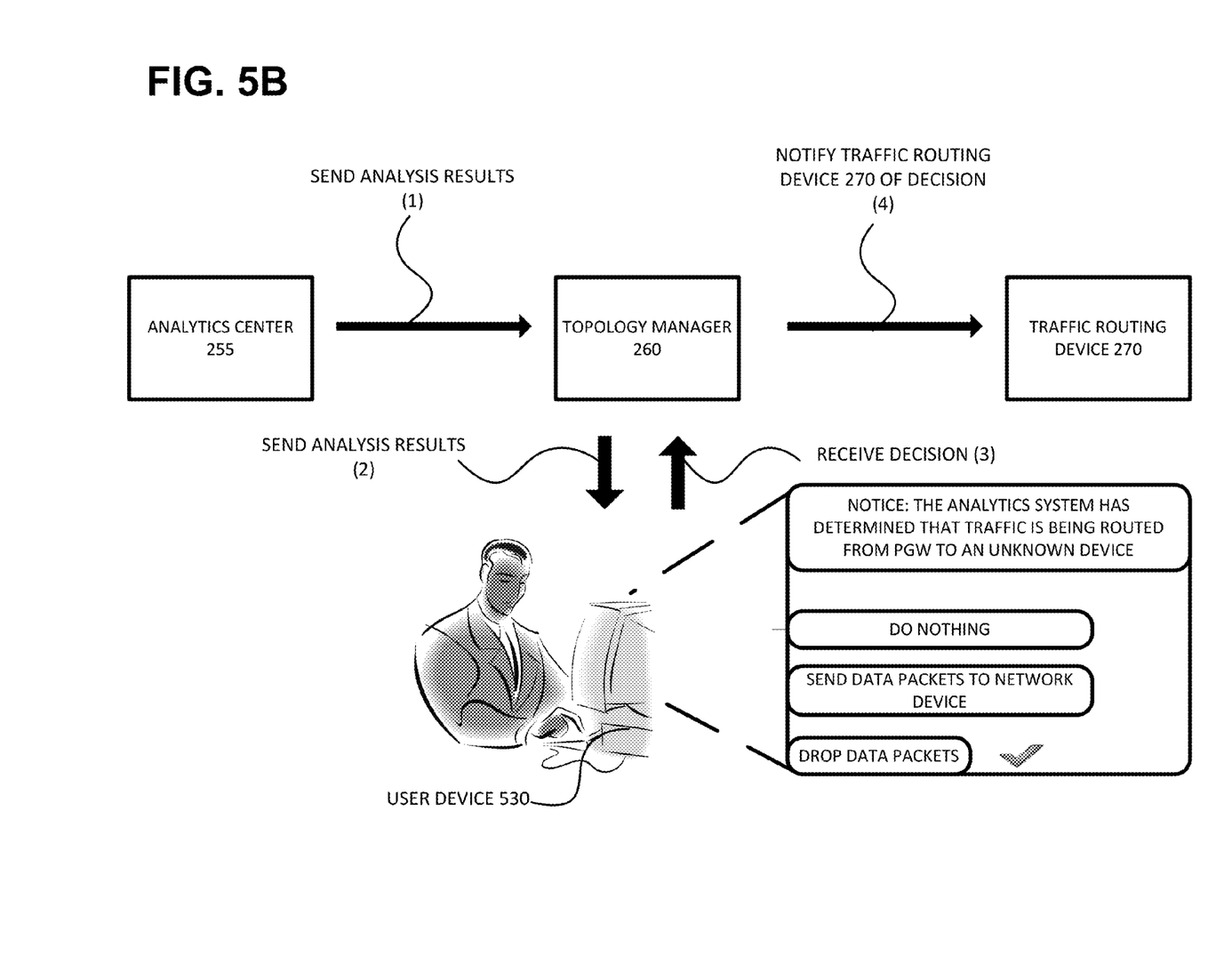

FIGS. 5A-5B are diagrams of example processes for analyzing a network. FIG. 5A shows PGW 225, analytics center 255, network 285, user device 505, LTE network 510, ABC Bank 515, and device 520. An example of user device 505 and device 520 may each correspond to user device 205, described with regard to FIG. 2. An example of ABC Bank 515 may correspond to content provider 275. An example of LTE network 510 may correspond to one or more of the devices (base station 210, SGW 215, MME 220, HSS/AAA server 230, and CSCF server 235) that make up the access network, the EPC and/or the IMS Core, described with regard to FIG. 2.

As shown in FIG. 5A, a user ("Tom") is using his smart phone (user device 505) to request information regarding his bank account from his bank, ABC Bank. To receive information regarding his bank account, user device 505 sends a message, via LTE network 510 and PGW 225 to network 285. Network 285 may send the message to ABC Bank 515. In addition, another message is sent, via LTE network 510, PGW 225 and network 285, to device 520. As messages are being sent to/from network 285, analytics center 255 may be analyzing information regarding the messages. Analytics center 255 may receive information about the message being sent to device 520.

FIG. 5B shows analytic center 255, topology manager 260 and traffic routing device 270, and user device 530. An example of user device 530 may correspond to user device 205, described with regard to FIG. 2. Analytics center 255 may analyze the information regarding the message being sent to device 520. Analytics center 255 may determine that the message being sent to device 520 is not consistent with the operation of the network. Analytics center 255 may determine that the message is associated with an additional data packet flow which does not occur based on historical information stored in analytics center 255.

Analytics center 255 may determine that an action be taken regarding the message being sent to device 520. As shown in FIG. 5B, analytics center 255 may send analysis of the additional data packet flow to topology manager 260. Topology manager 260 may receive the analysis from analytics center 255. Topology manager 260 may format the analysis from analytics center 255 into a format that can be used within a user interface. Topology manager 260 may send the analysis information to user device 530. User device 530 is being used by an employee of the provider of LTE network 510. The employee is able to view a message (sent from topology manager 260) that notifies that traffic is being routed from PGW 225 to device 520 and that it is unknown what device 520 is doing with the data packet flows. The employee decides to select an option that drops the data packets being sent to device 520. By selecting the option, user device 530 sends a message to topology manager 260. Topology manager 260 receives the message from user device 530, and sends a notification to traffic routing device 270 instructing traffic routing device 270 to drop the data packets being sent to device 520. Traffic routing device 270 may receive the notification and determine that a message be sent to PGW 225, instructing PGW 225 to drop the data packets that are being sent to device 520.

As a result, a network may operate more efficiently based on an analysis system that is able to detect threats to network security, detect issues relating to QoS, and/or detect other issues within the network, and provide solutions to those potential network issues.

The foregoing description of implementations provides illustration and description, but is not intended to be exhaustive or to limit the implementations to the precise form disclosed. Modifications and variations are possible in light of the above disclosure or may be acquired from practice of the implementations.

While series of blocks have been described with regard to FIG. 4, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
   a network device, at least partially implemented in hardware, to:

receive information associated with a plurality of different types of data collection devices,
  the information relating to operation of devices associated with a cellular network and communications in the cellular network,
  the different types of data collection devices including at least two of:
    a first data collection computing device to collect data based on simple network management protocol (SNMP),
    a second data collection computing device to collect data based on syslog logging,
    a third data collection computing device to collect data based on central processing unit utilization,
    a fourth data collection computing device to collect data based on NetFlow data,
    a fifth data collection computing device to collect data based on session initiation protocol flow information exchange (SIPFix),
    a sixth data collection computing device to collect data based on internet protocol flow information exchange (IPFix),
    a seventh data collection computing device to collect data based on subscriber packets, or
    an eighth data collection computing device to collect data based on signaling links associated with set-up, management, or tear-down of communications;
analyze the information;
determine, based on a result of analyzing the information, that an issue exists relating to operation of the cellular network;
identify one or more options, of a plurality of options, for addressing the issue by changing one or more operational characteristics associated with the cellular network,
  the plurality of options including at least one of:
    adjusting a quantity of messages being delivered in the cellular network,
    adjusting a quantity of user devices connected to the cellular network,
    adjusting an amount of bandwidth associated with the cellular network, or
    causing incoming or outgoing messages, associated with the cellular network, to be sent to a particular network device for further analysis;
identify an option, of the one or more options, for addressing the issue;
send a message to one or more computing devices, associated with the cellular network, based on the identified option,
  the one or more computing devices causing changes to be made to the one or more operational characteristics, associated with the cellular network, based on the message,
    based on the one or more operational characteristics and the identified option, the one or more computing devices instructing one or more other network devices, at least partially implemented in hardware and associated with the cellular network, to:
      adjust the quantity of messages,
      adjust the quantity of user devices,
      adjust the amount of bandwidth, or
      cause the incoming or outgoing messages to be sent to the particular network device for further analysis.

2. The system of claim 1, where, when analyzing the information, the network device is further to:
  analyze the information to determine that there is greater than a threshold number of incoming messages into the cellular network; and
  where, when sending the message to the one or more computing devices, the network device is further to:
    send a notification to the one or more computing devices to reduce a quantity of user devices using the cellular network based on determining that there is greater than the threshold number of incoming messages into the cellular network.

3. The system of claim 1, where the information relates to outgoing messages from the cellular network, and where the network device is further to:
  determine that the outgoing messages are being sent to an unknown device;
  determine, based on determining that the outgoing messages are being sent to the unknown device, that a security threat exists relating to the operation of the cellular network; and
  send a message to a user device based on determining that the security threat exists,
    the user device notifying a second network device to send the outgoing messages to a third network device for further analysis.

4. The system of claim 1, where the information relates to outgoing messages from the cellular network, and where the network device is further to:
  determine that the outgoing messages are being sent during a period of time associated with a threat;
  determine, based on determining that the outgoing messages are being sent during a period of time associated with the threat, that a security threat exists relating to the operation of the cellular network; and
  send a particular message to a second network device based on determining that the security threat exists relating to the operation of the cellular network,
    the particular message notifying the second network device to prevent the outgoing messages from being sent to an external device.

5. The system of claim 4, where, when determining that the outgoing messages are being sent during the period of time associated with the threat, the network device is further to:
  analyze the outgoing messages to determine whether the security threat is an anomaly.

6. The system of claim 1, where the information relates to outgoing messages from the cellular network, and where the network device is further to:
  analyze the outgoing messages to determine that there is a pattern associated with the outgoing messages,
    the pattern indicating whether there is a security threat relating to the operation of the cellular network; and
  where the network device, when sending the message to the one or more computing devices, is further to:
    send the message based on analyzing the outgoing messages.

7. The system of claim 1, where the network device is further to:
  provide information identifying the plurality of options to a management device,
    the information identifying the plurality of options being displayed, by the management device on a user interface;
  receive, from the management device, information that identifies a selected option of the plurality of options, the selected option being selected via an interaction with the user interface; and where, when identifying the option, the network device is further to:

identify the option based on the selected option.

8. A method comprising:

receiving, by a network device at least partially implemented in hardware, information associated with a plurality of different types of data collection devices, the information relating to operation of devices associated with a cellular network and communications in the cellular network;

the different types of data collection devices including at least two of:

a first data collection computing device to collect data based on simple network management protocol (SNMP), a second data collection computing device to collect data based on syslog logging, a third data collection computing device to collect data based on central processing unit utilization, a fourth data collection computing device to collect data based on NetFlow data, a fifth data collection computing device to collect data based on session initiation protocol flow information exchange (SIPFix), a sixth data collection computing device to collect data based on internet protocol flow information exchange (IPFix), a seventh data collection computing device to collect data based on subscriber packets, or an eighth data collection computing device to collect data based on signaling links associated with set-up, management, or tear-down of communications;

analyzing, by the network device, the information;

determining, by the network device and based on a result of analyzing the information, that an issue exists relating to operation of the cellular network;

identifying, by the network device, one or more options, of a plurality of options, for addressing the issue, the plurality of options including at least one of:

adjusting a quantity of messages being delivered in the cellular network, adjusting a quantity of user devices connected to the cellular network, adjusting an amount of bandwidth associated with the cellular network, or causing incoming or outgoing messages, associated with the cellular network, to be sent to a particular network device for further analysis;

identifying an option, of the one or more options, for addressing the issue;

sending, by the network device, a message to one or more computing devices, associated with the cellular network, based on the identified option, the message causing the one or more computing devices to cause a change to be made to an operational characteristic associated with the cellular network, based on the operational characteristic and the identified option, the one or more computing devices causing one or more other network devices, at least partially implemented in hardware and associated with the cellular network, to:

adjust the quantity of messages, adjust the quantity of user devices, adjust the amount of bandwidth, or cause the incoming or outgoing messages to be sent to the particular network device for further analysis.

9. The method of claim 8, where analyzing the information further comprises:

analyzing the information to determine that there is a security threat associated with incoming messages to the cellular network; and sending a notification to a second network device, the second network device changing a flow rate associated with the incoming messages to reduce the security threat.

10. The method of claim 8, where determining that the issue exists relating to the operation of the cellular network further comprises:

determining that there is not enough bandwidth allocated to a geographic region within the cellular network; and where sending the message further comprises:

sending a message to cause an increase in the amount of bandwidth allocated to the geographic region.

11. The method of claim 8, further comprising:

sending a notification to a user device, the notification notifying the user device that a change is being made to the operation of the cellular network.

12. The method of claim 8, where analyzing the information further comprises:

analyzing the information to determine that there is a security threat associated with outgoing messages from the cellular network; and sending a first notification to a second network device, the second network device sending a second notification, based on the first notification, to a third network device to terminate the security threat.

13. The method of claim 12, where analyzing the information to determine that there is a security threat further comprises:

comparing historical flow rate information for incoming messages to the cellular network and outgoing messages from the cellular network with a flow rate of current incoming messages to the cellular network and current outgoing messages from the cellular network to determine whether there is a security threat.

14. The method of claim 8, where determining that the issue exists relating to the operation of the cellular network further comprises:

determining that there is an above average quantity of user devices connected to the cellular network; and where sending the message further comprises:

sending a notification to reduce the quantity of user devices connected to the cellular network based on determining that there is an above average quantity of user devices connected to the cellular network.

15. The method of claim 8, where receiving the information associated with the plurality of different types of data collection devices further comprises:

receiving information associated with flow rates of incoming and outgoing messages from a second network device, associated with the cellular network, to a first user device connected to the cellular network; and receiving information associated with a type of service, being used by a second user device, associated with the incoming and outgoing messages from the second network device to the first user device.

16. The method of claim 8, further comprising:

providing, to a management device, information that identifies the plurality of options, the information that identifies the plurality of options being displayed, by the management device, on a user interface;

receiving, from the management device, information that identifies a selected option of the plurality of options, the selected option being selected via an interaction with the user interface; and where identifying the option further comprises:
identifying the option based on the selected option.

17. A non-transitory computer-readable medium storing instructions, the instructions comprising:
one or more instructions that, when executed by one or more processors, cause the one or more processors to:
receive information associated with a plurality of different types of data collection devices,
the information relating to operation of devices associated with a cellular network and communications in the cellular network,
the different types of data collection devices including at least two of:
a first data collection computing device to collect data based on simple network management protocol (SNMP),
a second data collection computing device to collect data based on syslog logging,
a third data collection computing device to collect data based on central processing unit utilization,
a fourth data collection computing device to collect data based on NetFlow data,
a fifth data collection computing device to collect data based on session initiation protocol flow information exchange (SIPFix),
a sixth data collection computing device to collect data based on internet protocol flow information exchange (IPFix),
a seventh data collection computing device to collect data based on subscriber packets, or
an eighth data collection computing device to collect data based on signaling links associated with set-up, management, or tear-down of communications;
analyze the information;
determine, based on a result of analyzing the information, that an issue exists relating to an operation of the cellular network;
identify one or more options, of a plurality of options for addressing the issue,
the plurality of options including at least one of:
adjusting a quantity of messages being delivered in the cellular network,
adjusting a quantity of user devices connected to the cellular network,
adjusting an amount of bandwidth associated with the cellular network, or
causing incoming or outgoing messages, associated with the cellular network, to be sent to a particular network device for further analysis;
identify an option, of the one or more options, for addressing the issue;
send a message to one or more computing devices, associated with the cellular network, based on the identified option,
the one or more computing device causing changes to be made to one or more operational characteristics, associated with the cellular network, based on the message and the identified option,
the one or more computing devices instructing one or more other network devices, at least partially implemented in hardware and associated with the cellular network, to:
adjust the quantity of messages,
adjust the quantity of user devices,
adjust the amount of bandwidth, or
cause the incoming or outgoing messages to be sent to the particular network device for further analysis.

18. The non-transitory computer-readable medium of claim 17, where the one or more instructions, that cause the one or more processors to receive the information from the plurality of different types of data collection devices, further cause the one or more processors to:
receive a first set of data, regarding incoming messages to a user device, that includes a flow rate of the incoming messages; and
receive a second set of data, regarding outgoing messages from the user device, that includes identification of a server that is receiving the outgoing messages.

19. The non-transitory computer-readable medium of claim 17, where the one or more instructions, that cause the one or more processors to analyze the information, further cause the one or more processors to:
analyze the information to determine that there is a security threat associated with outgoing messages from the cellular network; and
send a first notification to a second network device,
the second network device sending a second notification, based on the first notification, to a third network device to terminate the security threat.

20. The non-transitory computer-readable medium of claim 17, where the one or more instructions further cause the one or more processors to:
provide information identifying the plurality of options to a management device,
the information identifying the plurality of options being displayed, by the management device, on a user interface;
receive, from the management device, information that identifies a selected option of the plurality of options,
the selected option being selected via an interaction with the user interface; and
where the one or more instructions, that cause the one or more processors to identify the option, further cause the one or more processors to:
identify the option based on the selected option.

* * * * *